R. E. PRICE.
CHICKEN HOUSE.
APPLICATION FILED MAY 21, 1915.
1,176,243.
Patented Mar. 21, 1916.
3 SHEETS—SHEET 3.
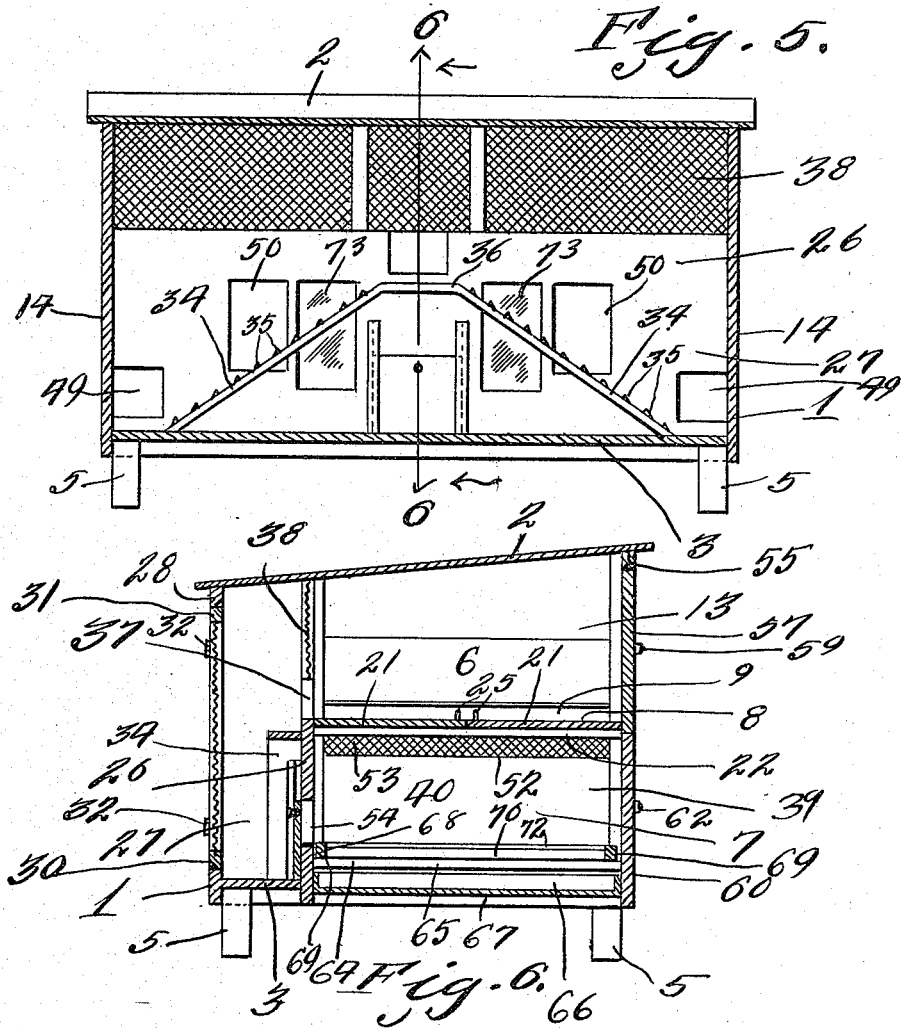
Witnesses
Philip ...
Frances ...
Inventor
R. E. Price
By D. Swift & Co.
his Attorneys

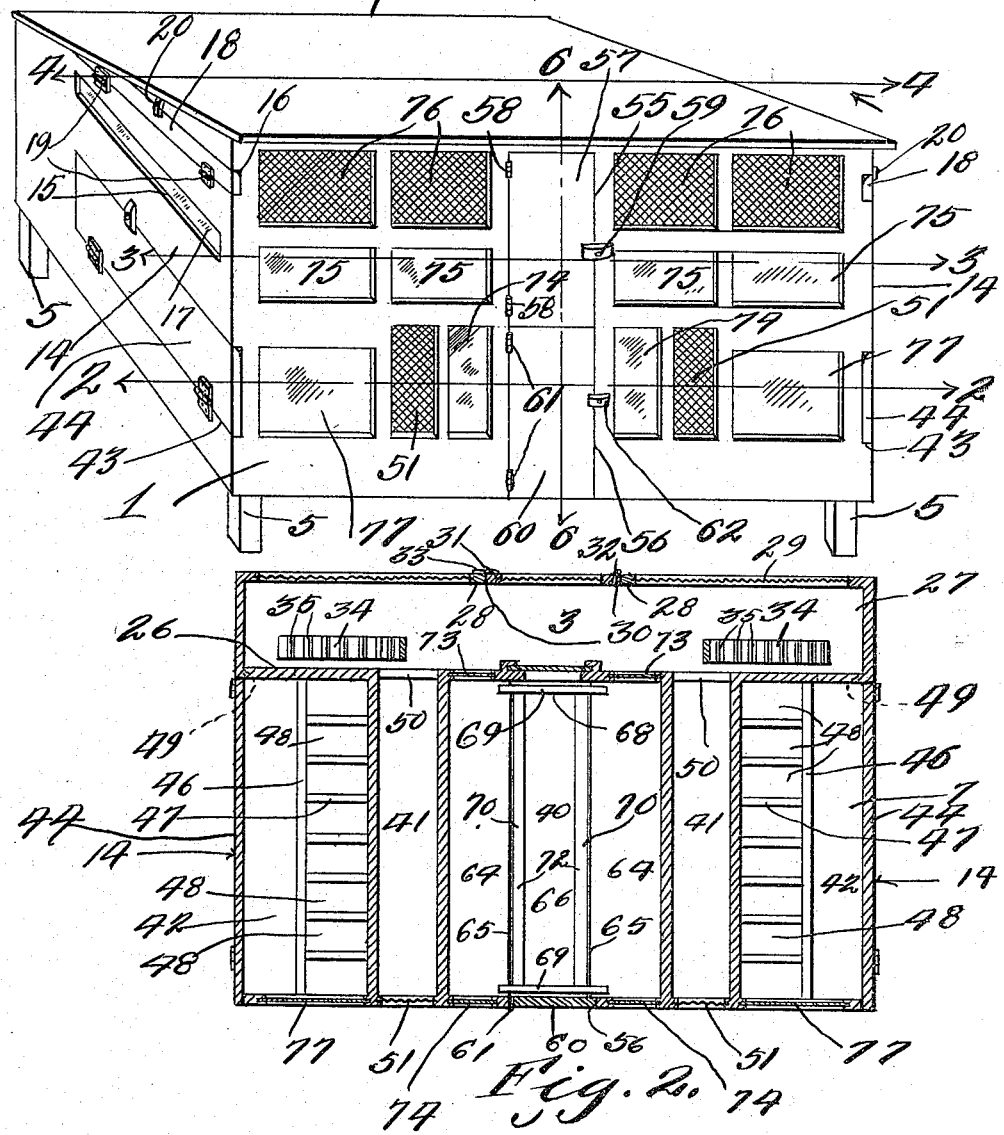

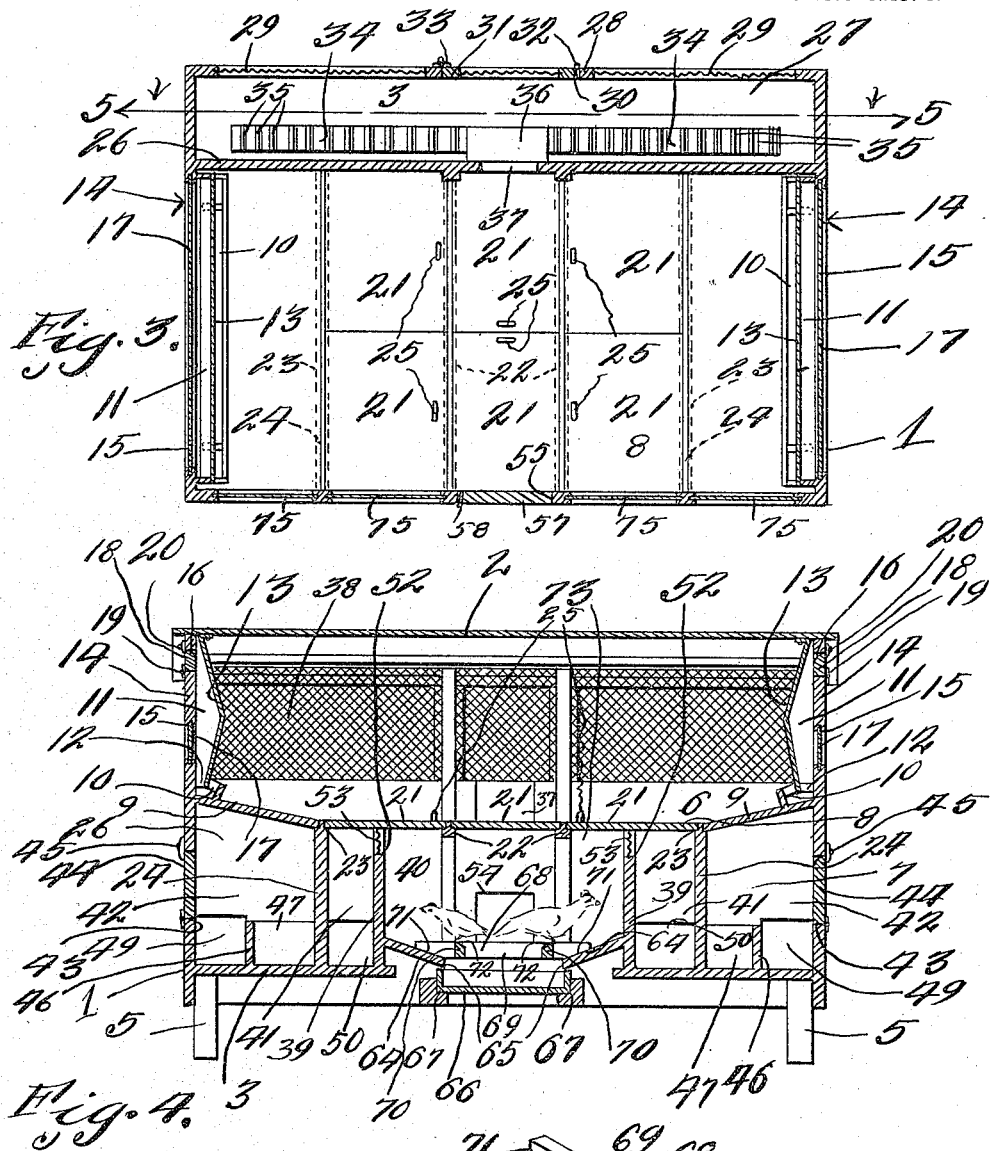

UNITED STATES PATENT OFFICE.

RICHARD E. PRICE, OF FAIRVIEW, WEST VIRGINIA.

CHICKEN-HOUSE.

1,176,243.   Specification of Letters Patent.   Patented Mar. 21, 1916.

Application filed May 21, 1915. Serial No. 29,507.

*To all whom it may concern:*

Be it known that I, RICHARD E. PRICE, a citizen of the United States, residing at Fairview, in the county of Marion and State of West Virginia, have invented a new and useful Chicken-House; and I do hereby declare the following to be a full, clear, and exact description of the invention, such as will enable others skilled in the art to which it appertains to make and use the same.

This invention relates to an improved chicken house, and an object of the invention is to provide an apparatus of this character provided with various compartments, in which the chickens can conduct their various habits, particularly that of roosting.

A further object of the invention is to provide a roosting compartment having a removable roosting frame provided with roosting rails having their upper edges inclosed downwardly and toward each other so as to cause the chickens to roost thereon with their rear portions toward each other, there being a removable tray under the roosting frame, for the reception of the excrement.

A further object of the invention is to provide a scratching compartment, the floor of which is constructed into sections, which are removable for cleaning purposes, said scratching compartment having feed troughs, one at each end, there being a passage having an exteriorly opening door whereby said trough may be replenished with feed from the exterior.

A further object of the invention is to provide a general entrance compartment, which has communications with all the other compartments, whereby some of the chickens may enter either the nesting, the roosting, dusting, or scratching compartments.

In practical fields the details of construction may necessitate alterations, falling within the scope of what is claimed.

The invention comprises further features and combination of parts, as hereinafter set forth, shown in the drawings and claimed.

In the drawings: Figure 1 is a view in perspective of the improved chicken house constructed in accordance with the invention. Fig. 2 is a transverse sectional view on line 2—2 of Fig. 1, illustrating the roosting, dusting and nesting compartments. Fig. 3 is a sectional view on line 3—3 of Fig. 1, showing the scratching compartment, illustrating the floor thereof constructed in sections, so that the sections may be removed for cleaning, and disclosing the feed troughs. Fig. 4 is a vertical sectional view on line 4—4 of Fig. 1, which illustrates the roosting, dusting, nesting and scratching compartments, at each end of which scratching compartment a feed trough is provided. Fig. 5 is a sectional view on line 5—5 of Fig. 3, illustrating the general entrance compartment. Fig. 6 is a sectional view on line 6—6 of Fig. 5. Fig. 7 is an enlarged detail perspective view of the roosting frame of the roosting compartment.

Referring more especially to the drawings, 1 designates the frame as a whole of the chicken house, which may be any desired shape, and proportioned as desired. The frame is provided with a suitable roof 2, and a suitable base floor 3, and the entire frame may be supported upon suitable posts 5. The greater portion of the frame is divided into two tiers 6 and 7 by the intermediate flooring 8. The end portions of the flooring 8 are inclined downwardly and toward each other, as indicated at 9, and the higher parts of the inclined portion have feed troughs 10, there being passages 11 opening at 12 into said troughs. The passages 11 are constructed by the provision of the angular boards, members or plates 13, which are spaced apart from two of the sides of the chicken house. The two sides 14 of the chicken house have openings 15 and 16, and in the openings 15 sheets of glass or other transparent material 17 are fixed, so that the feed in the trough can be seen from the exterior of the house, thereby disclosing readily when the feed troughs need replenishing. The openings 16 are designed for the purpose of permitting the feed to pass through the passages 11 into the troughs, said openings being closed by the closures 18, hinged at 19 and provided with latches 20. The majority of the flooring 8 is constructed of a plurality of sections 21, which rest upon the cross beams 22 and the edges 23 of the partitions 24. These sections are provided with the members 25, constituting means to be grasped so that the sections may be removed for cleaning.

The rear portion of the chicken house is divided vertically by a partition 26, to form or provide the general entrance or living compartment 27. The rear wall of the house is constructed of a frame 28, which is covered with a suitable meshwork 29, there being a door opening 30 having a door 31 hinged at 32, which door opening is for the purpose of permitting the chickens to enter the compartment 27. The door 31 has a suitable latch 33. Arranged in the general entrance compartment 27 is a pair of tread boards 34 having transverse cleats 35, and which boards are arranged inclined upwardly and toward each other to a platform 36, which is just below an opening 37 in the upper portion of the partition 26. By provision of the tread board 34 and the opening 27 the fowls are allowed to pass into the scratching compartment. A sheet of meshwork 38 forms the upper part of the partition 26.

The lower tier or space of the greater forward portion of the chicken house is divided by the partitions 24 and the partitions 39 into five compartments, for instance, a roosting compartment 40, two dusting compartments 41, and two nesting compartments 42. Each of the end walls 14 of the chicken house has an opening 43 provided with a closure 44, there being a latch 45, to permit access into each of the nesting compartments. Each of the nesting compartments is subdivided by the partitions 46 and 47 into nest receiving spaces 48. An opening 49 of communication is formed in the partition 26 at each end thereof at its lower portion, thereby permitting the fowls to enter the nesting compartment from the living or general entrance compartment. There is also an opening 50 in the partition 26, thereby affording communication between the living compartment 27 and each of the dusting compartments. The forward wall of the chicken house adjacent the dusting compartment is provided with screen covered openings 51, to afford ventilation. The upper parts of the partitions 29 are provided with elongated openings 52 having screening 53, thereby permitting ventilation between the dusting compartment and the roosting compartment. The partition wall 26 centrally thereof at its lower portion has an opening 54, affording communication between the living compartment and the roosting compartment. The front wall of the house, substantially centrally thereof is provided with two openings 55 and 56. The upper opening 55 is provided for the purpose of permitting an entrance and exit into and from the scratching compartment, directly from the exterior. The opening 55 has a closure 57 hinged at 58 there being a latch 59. The opening 56 permits an entrance and exit into the roosting compartment directly from the exterior, and is also provided with a closure 60 hinged at 61 having a latch 62. Arranged in the roosting compartment, and inclining downwardly and toward each other from the partitions 29 are inclined supporting boards 64, the adjacent edges 65 of which overlie the sliding tray 66, which is slidably mounted in the guides 67. A roosting frame 68 is arranged in the roosting compartment, and this roosting frame consists of the end beams 69 and the longitudinally extending roosting beams 70. The end edges of the beams 69 are beveled off as shown at 71 to engage the inclined supporting boards 64, thereby supporting the roosting frame. The upper edges of the roosting beams 70 are inclined or beveled downwardly and toward each other as shown at 72, so as to cause the fowls to roost thereon with their heads in the opposite direction, and their rear portions adjacent each other, in order to cause the droppings or excrement to fall into the sliding tray 66, which may be removed and cleaned. The roosting frame may also be removed for cleaning purposes. The partitions 26 adjacent the rear of the roosting compartment are provided with glass covered openings 73, whereas the front wall adjacent the roosting compartment has glass covered openings 74. The front wall of the chicken house adjacent the scratching compartment has glass and screen covered openings 75 and 76, there being glass covered openings 77 in the front wall of the chicken house, in order to admit light into the nesting compartments.

From the foregoing it is to be noted that there has been devised an improved chicken house having all of the necessary and essential compartments, whereby the fowls may conduct all of their necessary habits, and which house is sanitary in view of the fact that it can be easily kept clean, and well ventilated. It has been found that in cold weather the screen covered openings may be additionally covered by canvas pieces (not shown).

The invention having been set forth, what is claimed as new and useful is:—

1. In a chicken house, a frame being provided with a roosting compartment, supporting boards in the roosting compartment, a roosting frame mounted on said boards, said frame having longitudinally extending rails disposed in parallelism and having their upper edges beveled downwardly and toward each other to cause the fowls to roost with their heads in opposite directions.

2. In a chicken house, a frame being provided with a roosting compartment, supporting boards in the roosting compartment, a roosting frame mounted on said boards, said frame having longitudinally extending rails disposed in parallelism and having their upper edges beveled downwardly and toward each other to cause the fowls to roost with their heads in opposite directions, guides in the roosting compartment, and an excrement receiving tray removably mounted in said guide beneath the roosting rails.

3. In a chicken house, a frame, a roosting compartment formed in said frame, a pair of oppositely disposed supporting boards in said compartment inclined downwardly and toward each other, a roosting frame, said roosting frame consisting of transverse end beams and longitudinally extending parallel roosting rails, the lower end edges of the transverse beams being beveled to engage the inclined supporting boards, and a removable tray under the roosting rails for the reception of the excrement.

4. In a chicken house, a frame, a roosting compartment formed in said frame, a pair of oppositely disposed supporting boards in said compartment inclined downwardly and toward each other, a roosting frame, said roosting frame consisting of transverse end beams and longitudinally extending parallel roosting rails, the lower end edges of the transverse beams being beveled to engage the inclined supporting boards, and a removable tray under the roosting rails for the reception of the excrement, said roosting rails having their upper edges beveled downwardly and toward each other.

5. A chicken house having a roosting compartment, a pair of supporting members being inclined downwardly and toward each other and having their lower edges extending in a plane parallel to each other, a roosting frame consisting of transverse end rails having their lower end edges beveled correspondingly to the inclination of the supporting members and engaging therewith, and longitudinally extending parallel roosting rails connecting the end rails and having their upper edges beveled downwardly and toward each other.

In testimony whereof I have signed my name to this specification in the presence of two subscribing witnesses.

RICHARD E. PRICE.

Witnesses
 C. O. NILS,
 G. R. MILLER.

Copies of this patent may be obtained for five cents each, by addressing the "Commissioner of Patents, Washington, D. C."